(12) United States Patent
Huang

(10) Patent No.: US 11,409,730 B2
(45) Date of Patent: Aug. 9, 2022

(54) BLOCKCHAIN-BASED TRANSACTION PLATFORM WITH ENHANCED SCALABILITY, TESTABILITY AND USABILITY

(71) Applicant: Digital Transaction Limited, Hong Kong (HK)

(72) Inventor: Ian Yuan Yuan Huang, Hong Kong (CN)

(73) Assignee: Eternal Paradise Limited, Mahe (SC)

( * ) Notice: Subject to any disclaimer, the term of this patent is extended or adjusted under 35 U.S.C. 154(b) by 0 days.

(21) Appl. No.: 16/629,951

(22) PCT Filed: May 21, 2019

(86) PCT No.: PCT/CN2019/087783
§ 371 (c)(1),
(2) Date: Jan. 9, 2020

(87) PCT Pub. No.: WO2019/223681
PCT Pub. Date: Nov. 28, 2019

(65) Prior Publication Data
US 2021/0097059 A1    Apr. 1, 2021

Related U.S. Application Data

(60) Provisional application No. 62/675,157, filed on May 22, 2018.

(51) Int. Cl.
*G06F 16/23*    (2019.01)
*G06F 16/21*    (2019.01)

(52) U.S. Cl.
CPC ........ *G06F 16/2365* (2019.01); *G06F 16/219* (2019.01); *G06F 16/2379* (2019.01)

(58) Field of Classification Search
None
See application file for complete search history.

(56) References Cited

U.S. PATENT DOCUMENTS 10,404,471 B1 *  9/2019  Griffin .................. H04L 9/3247
2004/0254984 A1  12/2004  Dinker
(Continued)

FOREIGN PATENT DOCUMENTS

CN    106445711 A    2/2017
CN    106686087 A    5/2017
(Continued)

OTHER PUBLICATIONS

International Search Report and Written Opinion, PCT/CN2019/087783, dated Aug. 22, 2019, 9 pages.

*Primary Examiner* — Scott A. Waldron
(74) *Attorney, Agent, or Firm* — Norton Rose Fulbright US LLP

(57) ABSTRACT

Provided is a method of truncating one or more blocks in a blockchain (300) by an aging process executed by participating computer node (501, 502) of the blockchain. The method includes truncating one or more blocks (310, 320) with a time stamp (210) that is older than a pre-determined cut-off time ($t_1$) by the computer node; creating a new block (360) in which one or more data packets of the new block capture essential data (312, 320) of blocks that are truncated; and appending the new block to the blockchain.

17 Claims, 5 Drawing Sheets

(56) References Cited

U.S. PATENT DOCUMENTS

| | | | |
|---|---|---|---|
| 2018/0323963 A1* | 11/2018 | Stallman | G06F 16/86 |
| 2019/0058581 A1* | 2/2019 | Wood | G06F 16/27 |
| 2019/0058709 A1* | 2/2019 | Kempf | H04L 9/3226 |
| 2019/0238319 A1* | 8/2019 | Beck | H04L 9/3247 |

FOREIGN PATENT DOCUMENTS

| | | | | |
|---|---|---|---|---|
| CN | 107733855 A | | 2/2018 | |
| WO | WO-2018103850 A1 | * | 6/2018 | ............. G06F 21/64 |
| WO | WO-2018111295 A1 | * | 6/2018 | ........... H04L 63/123 |

* cited by examiner

BLOCKCHAIN-BASED TRANSACTION PLATFORM WITH ENHANCED SCALABILITY, TESTABILITY AND USABILITY

CROSS-REFERENCE TO RELATED APPLICATION

This application is a national phase application under 35 U.S.C. § 371 of International Application No. PCT/CN2019/087783 filed May 21, 2019, which claims priority to U.S. Provisional Patent Application No. 62/675,157 filed May 22, 2018. The entire contents of each of the above-referenced disclosures is specifically incorporated by reference herein without disclaimer.

FIELD OF TECHNOLOGY

The present invention relates to a method of truncating blocks in a blockchain.

BACKGROUND

Blockchain technology is a decentralized, distributed data management technology that enables a collaborative, trusted working environment for a network of computers to work together. The blockchain can be thought of as a distributed electronic ledger that stores a list of transactions and records between participants. The data are stored in blocks and every block, except for the first block, is linked to a prior block to form a chain. This chain is replicated to every computer nodes or intelligent node of all the participants. Encryption technology is employed so that if any block is tampered, all the participants can detect it.

While blockchain technology has great potential and enable many new applications, its scalability and testability are major issues. There is thus a need in the art to address these and other problems.

SUMMARY

One example embodiment is a method of truncating one or more blocks in a blockchain by an aging process executed by participating computer node of the blockchain. The method includes truncating one or more blocks with a time stamp that is older than a pre-determined cut-off time by the computer node; creating a new block in which one or more data packets of the new block capture essential data of blocks that are truncated; and appending the new block to the blockchain. The essential data are data in pre-determined fields within the data packet of each block in the blockchain. The blocks that are truncated from the blockchain are archived and retrievable upon request.

Another example embodiment provides a method of validating transactions in a block in a blockchain. The method includes selecting a quorum that includes a subset of the computer nodes as quorum members by each computer node participating in the blockchain; voting among the quorum members that independently examine the transactions; receiving votes from the quorum members; and deciding the validity of the transactions by examining the votes.

Another example embodiment provides a blockchain system. The blockchain system includes a plurality of computer nodes participating to the blockchain system interconnecting with each other through a network, and one or more quorum members selected from these computer nodes to form a quorum. Each quorum member includes a quorum manager which is a software module that realizes a voting logic when executed. The voting logic includes voting steps of casting a vote; receiving votes from other quorum members; outputting a recommendation to all quorum members based on its own vote and the votes received by other quorum members; and reaching a consensus in a decentralized manner.

Other example embodiments are discussed herein.

DETAILED DESCRIPTION

Figure 1:
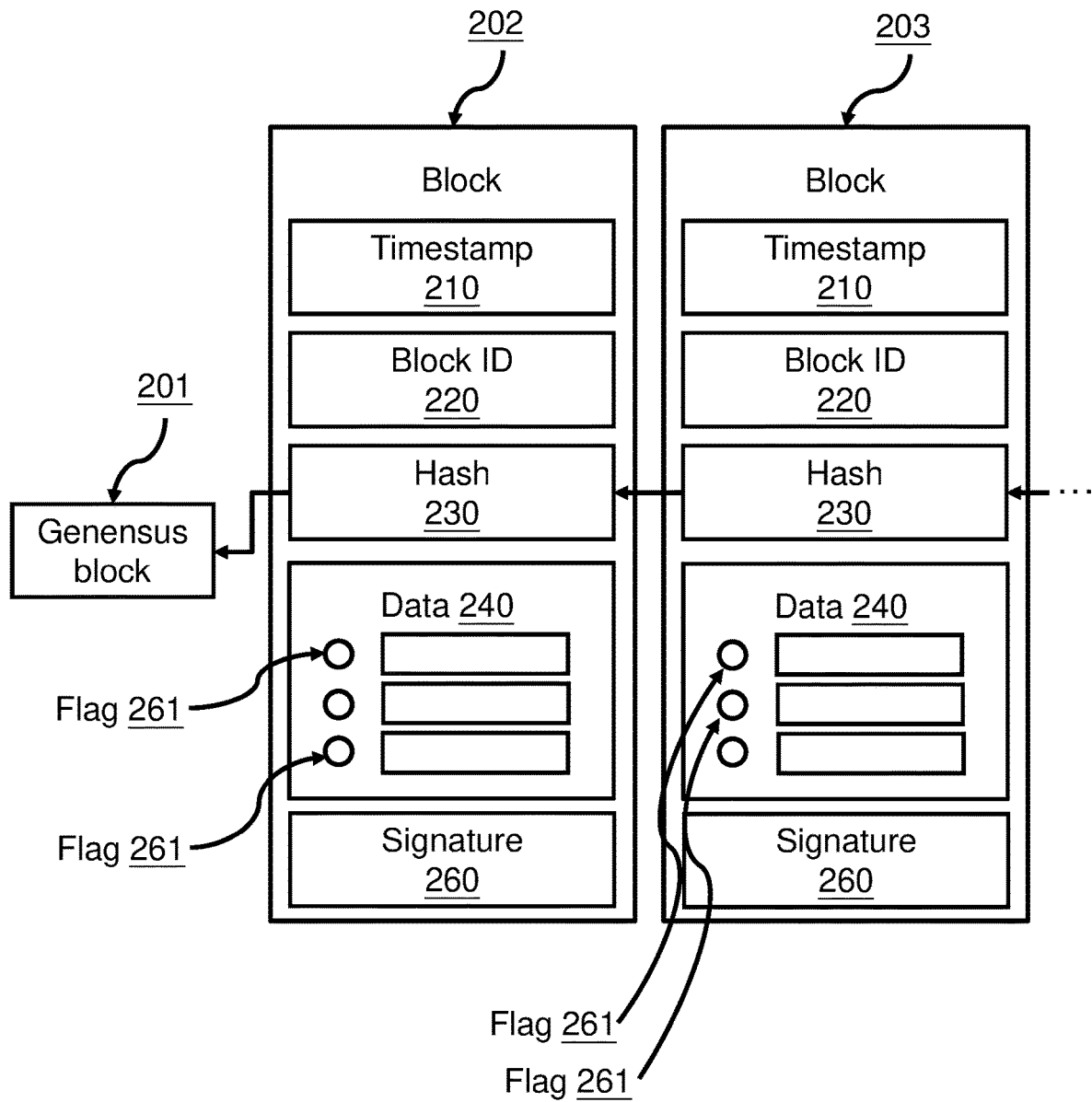
FIG. 1 shows an example of a block in a blockchain system in accordance with an example embodiment.

A blockchain creates trusted, traceable, and immutable system through a peer-to-peer network. FIG. 1 shows an embodiment of a data block in a blockchain. The chain comprises a genesis block 201, which is the first block of the chain, and blocks 202 and 203, etc., that are linked to the previous blocks to form the chain. In one embodiment, each block 201 and 202 comprises a plurality of fields such as a block ID 220, a time stamp 210 that records the time that this block is created, a hash value 230 of the previous block, a data packet 240 and a digital signature 260 which, in one implementation is a hash value of the entire block. In a further embodiment, the data packet 240 comprises a plurality of fields and its actual content depends on applications. For example, in a crypto-currency application, the data packet may consist of fields like 'From', 'To' and 'Amount', etc. In yet another embodiment, a flag 261 is associated with each data field. It indicates the importance of this field and its function will be explained later.

As the hash value 230 is a hash of the previous block, the integrity of the entire chain is guaranteed. This is because if a user tampers with the data packet in one of the block, its digital signature will be changed. Thus, the hash value 230 of subsequent blocks will not match with their stored values, causing the subsequent blocks to be invalid. Since the same blockchain is replicated to all other computer nodes within the network, unless the user can make the same alternation on all other chains in a short time, his action will be easily detected. Thus, rather than keeping information in one central point, as is done by traditional recording methods, multiple copies of the same data are stored in different locations and on different devices on the network, through a peer to peer (P2P) network. This means that even if one point of storage is damaged or lost, multiple copies remain safe and secure elsewhere. Similarly, if one piece of information is changed without the agreement of the rightful owners, there are countless other examples in existence, where the information is true, making the false record obsolete. It is this act of linking blocks into a chain that makes the information stored on the blockchain so trustworthy.

Figure 2:
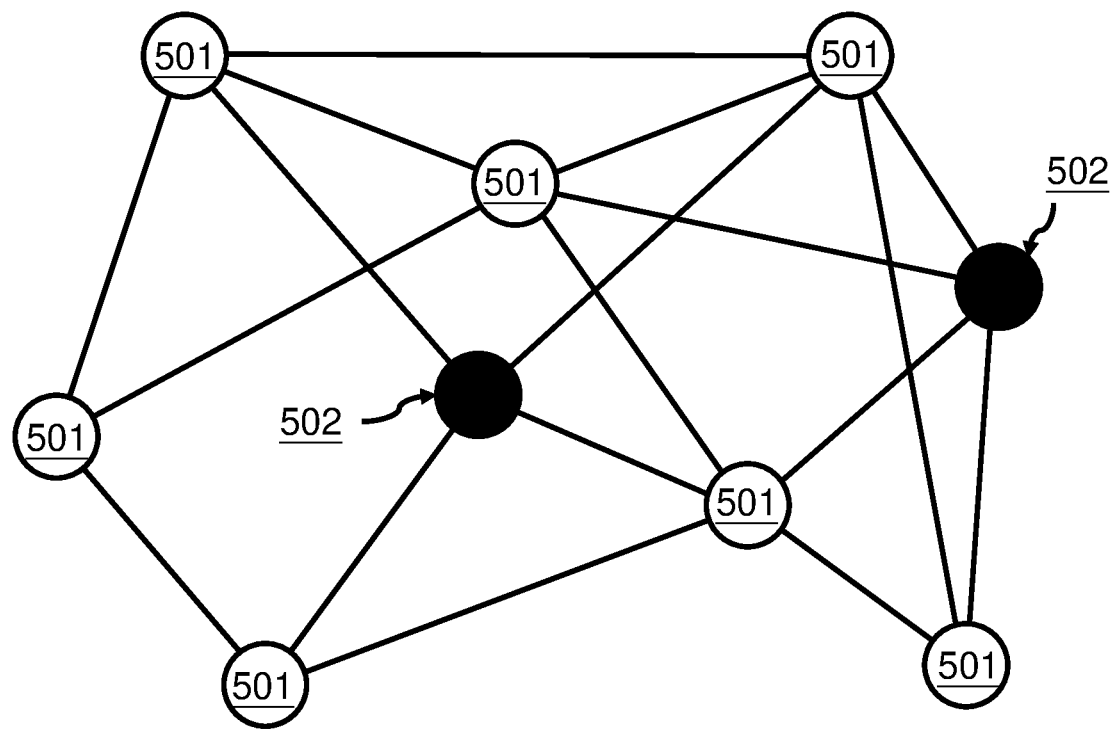
FIG. 2 shows a blockchain system in accordance with an example embodiment.

FIG. 2 shows a blockchain network in one embodiment. Nodes 501 and 502 are computer nodes that participate to this blockchain network. Each node installs a blockchain client software that can download the entire blockchain to its computer. Depending on the application domain, each block records a transaction such as payments or event tracking in a supply chain. Users can check all of the transactions and hash values in each block of the blockchain, and if any attempt to change anything on any of the block is made, the hash values will change, and the verification will fail. Thus, no central authority is required to monitor or control the validity of these events. The blockchain thus forms an immutable record.

When a new transaction is made in any of the computer nodes 501 or 502, a new block containing the data of that transaction is made. Before this block can be added to the chain, a process known as validation needs to take place. In essence, this block needs to satisfy certain predefined criteria before it can be appended to the chain.

Some of the existing validation methods are the Proof-of-Work or Proof-of-Stake procedures. However, these two methods require too much computation resources to perform. Hence the through-put and latency of the entire system suffer. In the bitcoin application, for example, Proof-of-Work method is used and the validation process is typically performed by special computer node with powerful computation capability. Even so, it takes about 10 minutes to validate a new transaction block. Thus, the usability and performance of such blockchain system is poor.

In view of this performance issue, a new validation scheme is disclosed.

In one embodiment, the validation process is determined by a quorum. A subset of the computer nodes are designated as quorum members. They are designated as nodes 502 in FIG. 2. When a new transaction is made, each quorum member can independently examine the new transaction and cast a vote to certify its validity. When the number of valid votes is higher than a pre-determined threshold, the quorum declares the new transaction valid and a new block is added to the chain. In one embodiment, the threshold is set to be one larger than half of the total quorum members. In a further embodiment, when the number of valid votes happens to be the same as that of invalid votes, a tie is declared and the quorum members are asked to vote again. But this time a higher threshold is used. In an embodiment, the higher threshold is 75% of the total number of quorum members. If the second round also ends up with a tie vote, then a new round is called for with an even higher threshold. This process is repeated until a tie is broken.

In a further embodiment, a weight value is assigned to each quorum member and the weighted sum is compared with the threshold. The new transaction is declared valid when the weighted sum exceeds either the threshold in the first round or the higher threshold in the second round of voting.

Once the new transaction is validated by the quorum, a new block containing the data of this transaction is created. The newly-created block is then time-stamped, the hash value of the previous block is inserted to the hash field 230, and a digital signature of the entire block is generated. Then the block is propagated to all the participating nodes of the blockchain.

If more than one validation requests are presented at any given time, they will be handled in a first-come-first-serve manner. Only when the present validation request is processed before the next one is entertained.

In one implementation, the quorum voting is handled by a quorum manager, which oversees the voting process. Different voting process may engage different quorum manager. The quorum manager is determined by the quorum members. The quorum manager may be implemented as a software application that resides in a computer node. In one embodiment, the quorum manager is performed by a centralized computer, i.e. by a single computer node. In another embodiment, a master-slave multi-computer architecture can be adopted to achieve fault-tolerance. In a further embodiment, the quorum voting mechanism is realized by a separate blockchain—the quorum-chain. This quorum-chain adopts the same blockchain structure as shown in FIG. 1. In each of the quorum-chain node, the data packet embeds computer codes that realizes the voting logic as mentioned above. As each quorum members receive the same voting recommendations from other members, each will reach the same conclusion as others, so a consensus can be reached in a decentralized manner.

In yet another embodiment, a membership manager is used to manage and coordinate quorum members. In certain blockchain applications, some users are recognized by all participating users as trustworthy, so they are predesignated as quorum members. By way of example, they may be government authorities and by law and regulations, they have the authority and thus can be trusted. Other users may obtain their trust from the blockchain participants and if their level of trustworthiness exceeds a pre-specified threshold, they can be promoted to be a quorum member. The membership manager thus handles and manages the promotion, demotion and related issues. Similar to the quorum manager, the membership manager can be realized in various ways. In an embodiment, the same blockchain technology can be used to implement this membership-chain. In another embodiment, the membership manager decides trust levels of quorum members by a voting process conducted by quorum members.

Adding new blocks under the quorum mechanism is fast since the number of quorum members is usually much less than the total number of participants in the blockchain application. Moreover, since all the quorum members are regarded as trusted members, there is no need to employ elaborated, computationally expensive method to guard against possible collusion or other faults.

On top of the validation issue mentioned before, existing blockchain has a scalability problem. Every participating node in the network must process every transaction and maintain a copy of the entire state, which limits the testability and usability of the blockchain. As the size of the blockchain grows, the requirements for storage, bandwidth, and compute power increases. As an example, the entire bitcoin blockchain requires 157 GB of storage as of May, 2018.

Example embodiments solve the scalability problem of the traditional blockchain by shortening the chain. An aging process is used to truncate a plurality of blocks with a time stamp that is older than a specific cut-off time.

Figure 3:
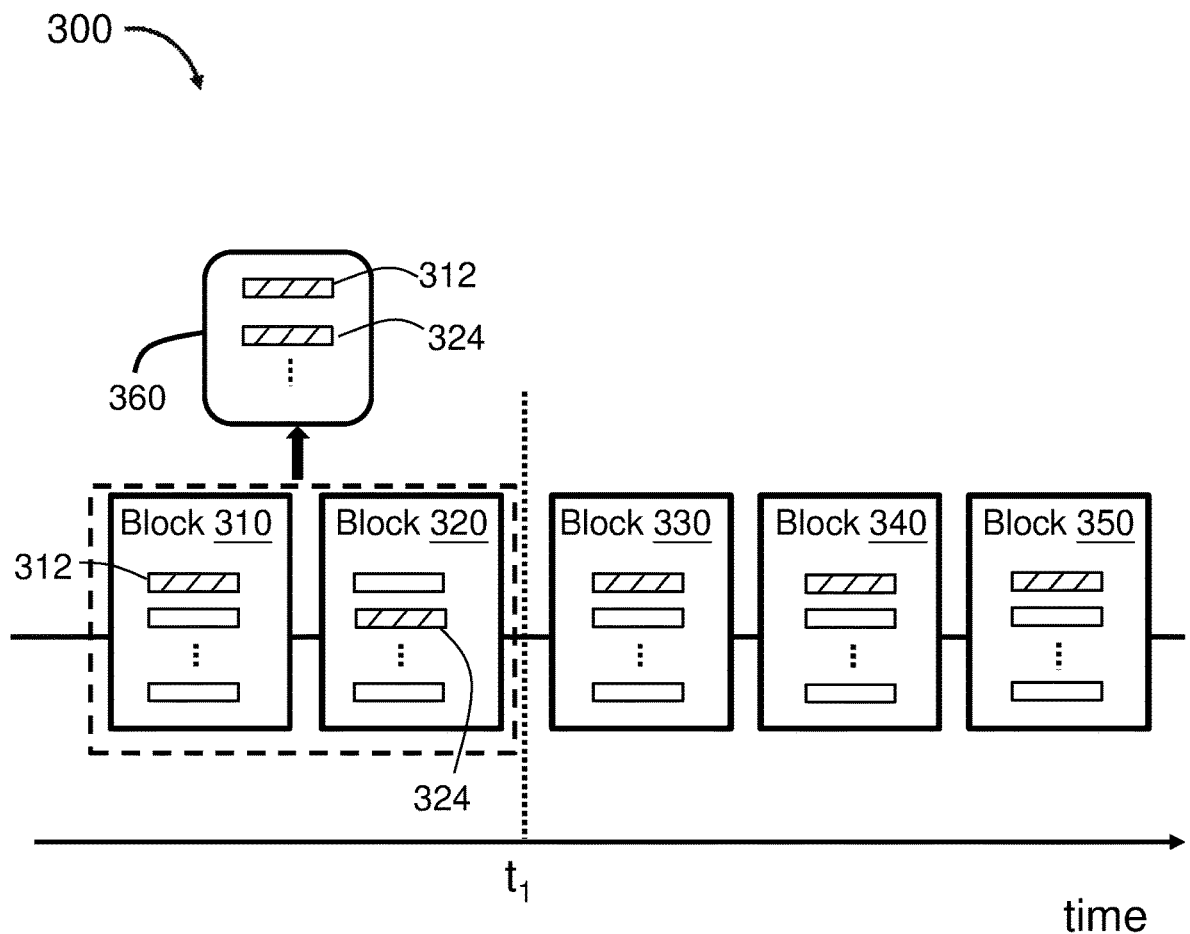
FIG. 3 shows a blockchain with the aging process in accordance with an example embodiment.

FIG. 3 shows a blockchain 300 with the aging process in accordance with an example embodiment. The blockchain includes a plurality of blocks 310, 320, 330, 340, 350 that are connected in a chain. Each block has a timestamp that records the time at which the block was added to the blockchain. The aging process truncates blocks 310 and 320 that have a time stamp older than a specific cut-off time t1. The cut-off time is programmable, such as 3 years or 12 months. The truncated blocks 310 and 320 are replaced by a newly created block 360 that keeps essential data 312 from the truncated block 310 and essential data 324 from the truncated block 320. These are the data fields that have their respective flags 261 set against their data fields. In essence, the essential data are migrated from the truncated block and kept in the newly created block 360 for easy reference.

By way of example, a computer system in a blockchain platform truncates one or more blocks whose time stamps are older than a pre-determined cut-off time. A new block is created and appended to the blockchain to include one or more data packets that capture essential data from the blocks that are truncated. For example, the essential data are data in pre-determined fields within the data packet of each block in the blockchain.

In one example embodiment, the pre-determined cut-off time and the pre-determined fields is decided by a voting process conducted by quorum members of the blockchain platform.

By way of example, the voting process is managed by a quorum manager and the quorum manager is a software module residing in each participating computer node of the blockchain. The quorum manager, when executed by a computer system, manages a quorum-chain that is a blockchain with each data packet in the quorum-chain embedding computer codes to realize a voting logic that includes voting steps of: casting a vote; receiving votes from other quorum members in the quorum chain; outputting a recommendation to all quorum members based on its own vote and the votes received by other quorum members; and reaching a consensus in a decentralized manner.

By way of example, the recommendation is a positive decision when the total number of quorum members who cast an affirmative vote is more than a first threshold; otherwise, the recommendation is a negative decision, and the consensus is reached when the number of the quorum-chain members exceeds a second threshold. Further, when a number of affirmative vote equals to that of non-affirmative vote, then the voting logic repeats the voting steps but the first threshold and the second threshold are set to be higher than those in the first round.

The above-described voting process can also be conducted by the membership manager in deciding trust levels of quorum members among existing quorum members.

The essential data that is taken from each of the truncated blocks is determined by the quorum mechanism discussed herein. The truncated or deleted blocks are confirmed to be validate and trust-worthy and the new block that represents the truncated blocks is stamped with a validation stamp.

In one example embodiment, the aging process is conducted by a quorum manager that is in one or more computers that connect with the blockchain through a network. The quorum manager collects votes from members of the quorum to determine the pre-determined cut-off time, such that blocks with a time stamp that is older than the pre-determined cut-off time are truncated from the blockchain.

In one example embodiment, the truncated blocks that are cut from the blockchain can be archived and retrievable upon request. For example, the truncated blocks are locked via multi-signature or some sort of smart contract, where the only way to update it is if a specific set of participants agree completely.

In an embodiment, the same quorum voting mechanism and implementation for the validation process can be used for the truncation operation. In another embodiment, this can be a separate process so a truncation blockchain (truncation-chain) can be implemented with its own specific membership-chain.

The aging process saves storage space, improves speed and transactional capacity without compromising on traceability and tamper-proof. Further, the aging process improves the testability and usability of the blockchain since the chain is shortened and since the transactions can be validated by lesser nodes in the network after the reduction of the number of blocks in the blockchain.

Consider an example in which a system includes a plurality of computer nodes each having a blockchain client software which is configured to communicate with a blockchain platform of the system. The blockchain client includes a quorum manager, a membership manager and software module to download one or more blockchains to its computer for processing.

Figure 4:
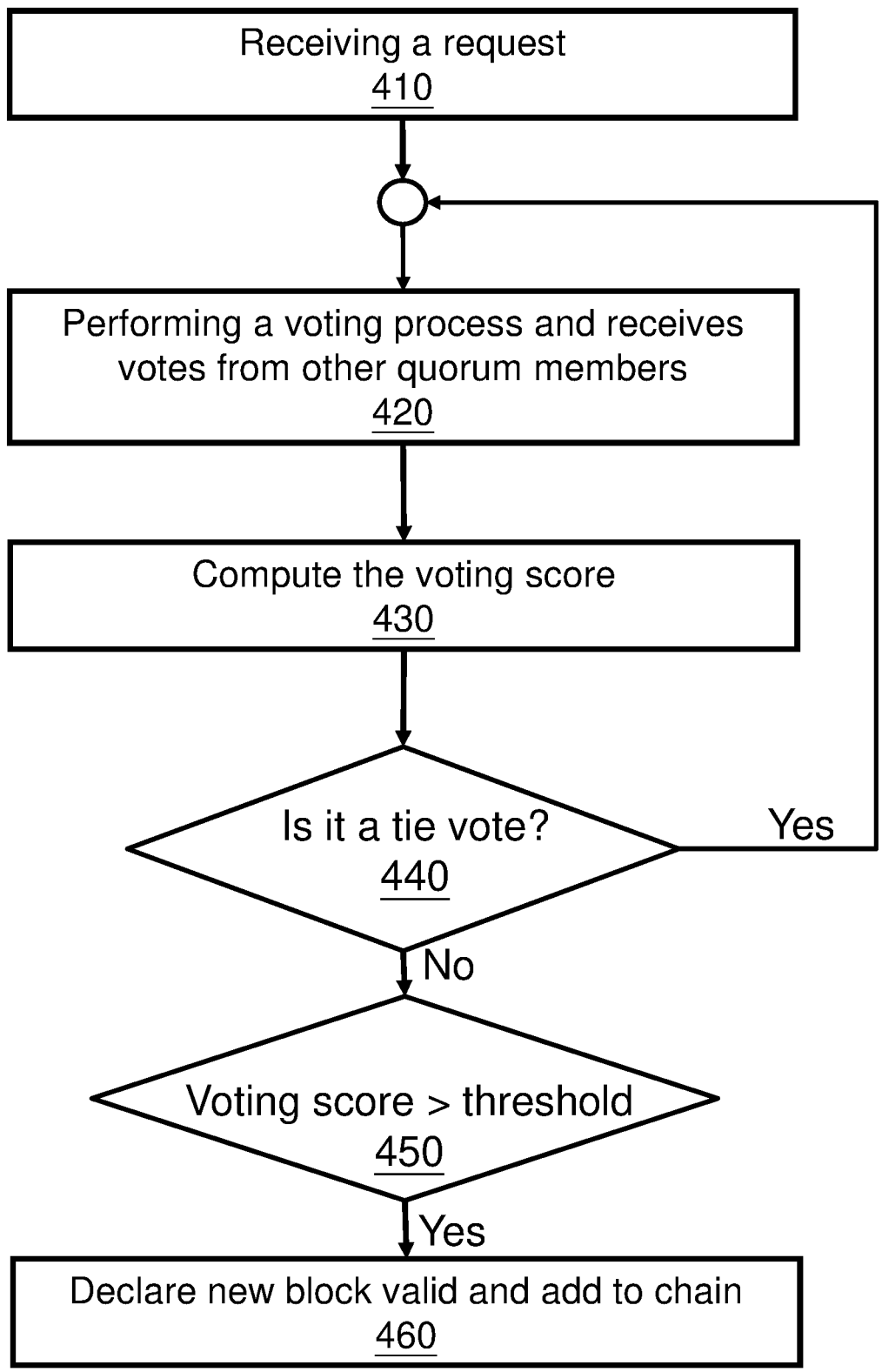
FIG. 4 shows a voting mechanism flowchart executed by the quorum manager of a blockchain client in accordance with an example embodiment.

FIG. 4 shows a method executed by a system on the quorum voting procedure using the quorum-chain method in accordance with an example embodiment. If this computer node is a quorum member, it will receive a validation request or a truncation request as well as a new block containing relevant information in step 410. The relevant information can be a new transaction data in the case of a validation request or the migration of past data in the case of a truncation request.

The quorum manager then performs a voting process to determine if the new block should be added to the blockchain. It first casts its own vote, and receives the voting results from other quorum members in step 420. Then it computes the overall voting score in step 430 according to the procedure disclosed earlier. If the vote is a tie, step 440 will pass control back to step 420 and retrieve a new threshold for the comparison in step 450; otherwise, it will check if the score is higher than a threshold in step 450. If so, step 460 declares that the new block is a valid block and will add this block to the chain. Otherwise, the new block is discarded.

Similarly, the membership manager of the blockchain client performs a similar procedure to compute the trust levels of the participants. It can recommend existing participants to be quorum members if the trust level satisfies certain criteria, or suggests a demotion if it finds certain existing quorum member not trustworthy. In both cases, the action can only be executed when a consensus is reached among participating users.

Figure 5:
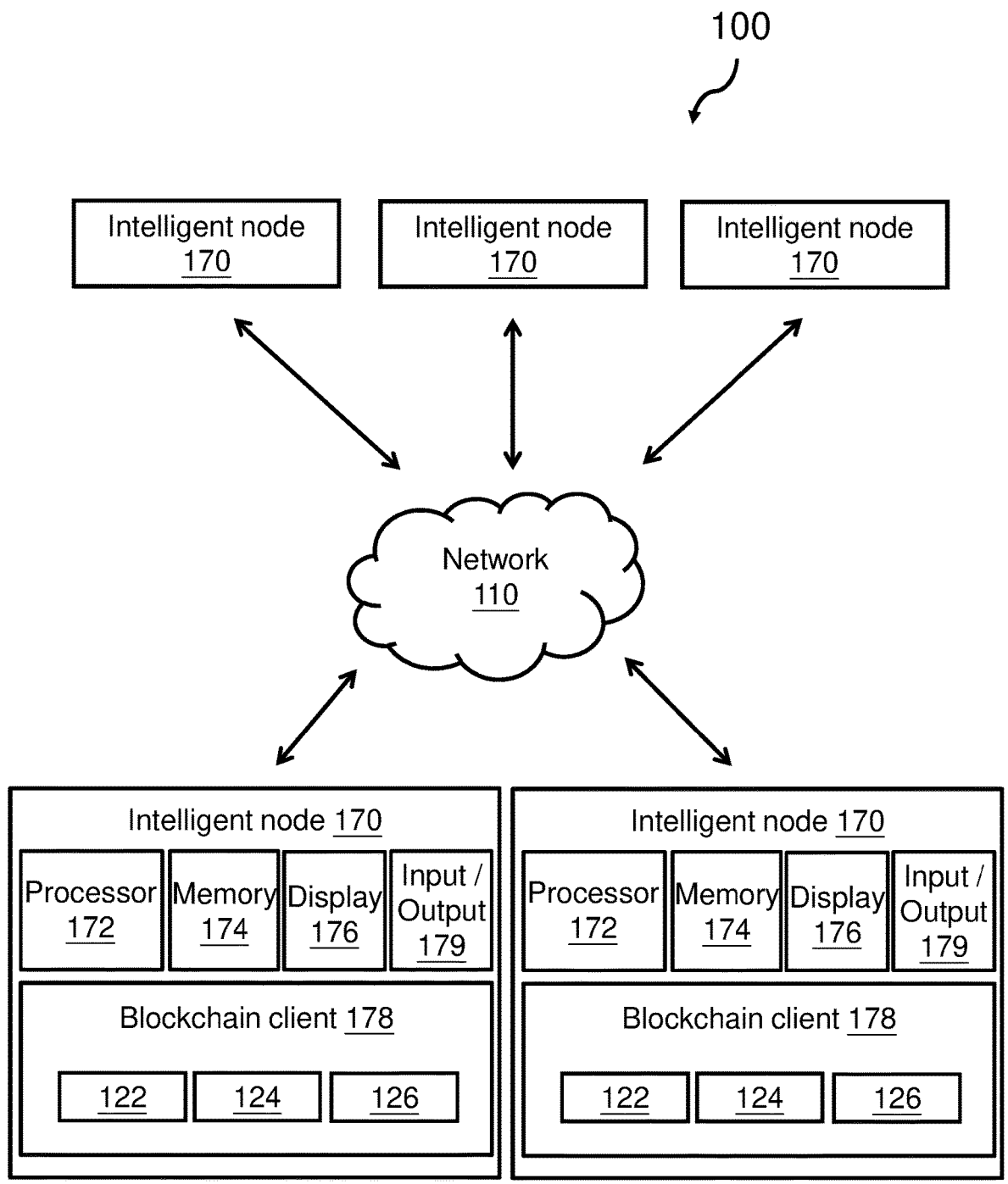
FIG. 5 shows a system block diagram of a blockchain system in accordance with an example embodiment.

FIG. 5 shows a block diagram of a blockchain system 100 in accordance with an example embodiment. The blockchain system 100 includes a plurality of intelligent nodes 170 interconnected via a network 110.

The networks 110 can be one or more computer networking technologies such as the Internet, an intranet, an extranet, a cellular network, a local area network (LAN), a home area network (HAN), metropolitan area network (MAN), a wide area network (WAN), a Bluetooth network, public and private networks, and/or the likes.

For each intelligent node 170 participating to this blockchain, the user can download and install a blockchain client 178. The blockchain client 178 is a software that includes a membership manager 122, a quorum manager 124, and a blockchain 126. As discussed earlier, the membership manager 122 manages the trustworthiness of the participants. The quorum manager 124 is in charge of the voting process among the quorum members.

The intelligent node 170 includes a processor 172 that communicates with a memory 174, a display 176, and an input/output (I/O) 179. In an example embodiment, the intelligent node can be one or more computers, smart phones or tablets.

By way of example, the blockchain system 100 is a distributed system. Many computers or intelligent nodes can connect to the blockchain system 100 through the network 110 and each intelligent node has a full copy of the chain. While the quorum manager 124 comes with the blockchain client 178 and is installed in each of the participating intelligent node 170, it may not be in use unless the user of this intelligent node is a quorum member. Similarly, the membership manager 122 may not be invoked if the user does not want to participate in determining the trustworthiness of other members.

By way of an application example, the blockchain technology discussed herein can play its role in streamlining logistic and transportation industry. The blockchain can enable participants to automate information collection and process through smart contracts with a lower overall cost due to faster transactions.

Consider an example embodiment in the airline industry. When a passenger flies from one city to another, many parties are involved—the travel agent where the passenger books his air ticket, the banks to settle the air ticket payments, the insurance company, the airline check-in counter, custom and immigration checkpoints at the departing city as well as that of the arrival city. As the passenger goes through his itinerary, each party involved will record a transaction and create a block in this air-travel blockchain. This chain is a public ledger for all the participating parties. So consider the scenario that the insurance company receives a claim from the passenger who claims a loss from a delayed flight, which is covered by the travel insurance plan the passenger has bought. The passenger submits the claim to the insurance company to trigger the process. The insurance company only needs to examine the blocks in this blockchain to ascertain what has transpire, and determine whether to honor or deny the claim. The insurance company is willing to trust the information in the blockchain since all the blocks in the chain are validated by trustworthy parties and the blockchain is immutable by nature. In this way, the claim can be processed in a short time.

The blockchain technology discussed herein can be applied to supply chain management. By way of example, the blockchain for supply chain management is not open to any participant but will instead involve closed networks of supply chain partners that have been invited to join. Depending on the product, the supply chain can span over hundreds of stages, geographical locations, invoices and payments, have several individuals and entities involved, and extend over months of time. Blockchain can optimize business transactions and trading relationships with robustly secure business networks on blockchain by offering a shared ledger that is updated and validated in real time with each network participant. It enables equal visibility of activities and reveals where an asset is at any point in time, who owns it and what condition it's in.

One can appreciate that as more transactions are put to the blockchain, it gets longer and longer. Its performance will eventually suffer. The inventive ideas discussed in this application address the scalability and performance issues so that a blockchain implementing the disclosed inventive ideas will not suffer from those issues.

What is claimed is:

1. A method of truncating one or more blocks in a blockchain by an aging process executed by participating computer node of the blockchain, the method comprising:
   truncating, by the computer node, one or more blocks with a time stamp that is older than a pre-determined cut-off time;
   creating a new block in which one or more data packets of the new block capture essential data of the one or more blocks that are truncated; and
   appending the new block to the blockchain,
   wherein the essential data are data in pre-determined fields within the data packet of the one or more blocks that are truncated, and
   wherein the blocks that are truncated from the blockchain are archived and retrievable upon request.

2. The method of claim 1, wherein the pre-determined cut-off time is decided by a voting process conducted by quorum members, and wherein the truncating includes deleting the one or more blocks with the time stamp that is older than the pre-determined cut-off time and replacing the one or more truncated blocks with the new block such that the essential data of the truncated blocks is migrated to the new block.

3. The method of claim 1, wherein the pre-determined fields are decided by a voting process conducted by quorum members.

4. The method of claim 1, wherein a membership manager decides trust levels of quorum members by a voting process conducted by the quorum members.

5. The method of claim 4, wherein the voting process is managed by a quorum manager, the quorum manager being a software module residing in each computer node, and when executed, realizes a voting logic that includes voting steps of:
   casting a vote;
   receiving votes from other quorum members in a quorum chain;
   outputting a recommendation to all quorum members based on its own vote and the votes received by other quorum members; and
   reaching a consensus in a decentralized manner.

6. The method of claim 5, wherein the recommendation is a positive decision when a total number of quorum members who cast an affirmative vote is more than a first threshold; otherwise, the recommendation is a negative decision, and the consensus is reached when the total number of the quorum-members exceeds a second threshold.

7. The method of claim 6, wherein when a number of affirmative votes equals a number of non-affirmative votes, then the voting logic repeats the voting steps but the first threshold and the second threshold are set to be higher than those previously.

8. The method of claim 5, wherein the quorum manager manages the quorum-chain, wherein the quorum-chain is a blockchain embedding voting logic data packets, and wherein in each quorum-chain node, the embedded voting logic data packets comprise computer codes that, when executed, realizes the voting logic.

9. A method of validating transactions in a block in a blockchain, the method comprising:
   selecting, by each computer node participating in the blockchain, a quorum comprising of a subset of the computer nodes as quorum members, wherein the quorum members include a quorum manager that manages a quorum-chain that is distinct from the blockchain and includes voting logic executable by the subset of computer nodes to control voting by the quorum members, the voting comprising;
   voting among the quorum members that independently examine the transactions, wherein a weight value is assigned to each quorum member and each valid vote is weighted by the weight value;
   outputting a recommendation to all quorum members based on its own vote and the votes received by other quorum members; and
   reaching a consensus in a decentralized manner.

10. The method of claim 9, wherein deciding the validity of the transactions is a positive decision when a sum of valid votes is higher than a pre-determined threshold, and a negative decision when the sum of valid votes is the same as or lower than the pre-determined threshold.

11. The method of claim 9, wherein the quorum manager is determined by the quorum members.

12. The method of claim 9, wherein the quorum manager is a software application residing in a centralized computer.

13. The method of claim 9, wherein the quorum manager is a master-slave multi-computer system to achieve fault tolerance.

14. A blockchain system comprising:
a plurality of computer nodes participating to the blockchain system interconnecting with each other through a network; and
one or more quorum members selected from these computer nodes to form a quorum for validating blocks of a blockchain maintained by the blockchain system,
wherein each quorum member comprises a quorum manager configured to manage a quorum-chain that is distinct from the blockchain, the quorum manager comprising a software module that when executed, realizes a voting logic that includes voting steps of:
casting a vote;
receiving votes from other quorum members;
outputting a recommendation to all quorum members based on its own vote and the votes received by other quorum members; and
reaching a consensus in a decentralized manner.

15. The blockchain system of claim 14, wherein the quorum-chain comprises voting logic data packets having embedded computer codes that, when executed, realizes the voting logic.

16. The blockchain system of claim 14, wherein each computer node further comprises a membership manager, the membership manager being a software module that when executed, manages promotion, demotion of computer nodes as quorum members.

17. The blockchain system of claim 14, wherein each computer node uses the voting logic and other computer nodes of the quorum to perform one of the following tasks:
determining a pre-determined cut-off time, wherein blocks in the blockchain having a timestamp older than the pre-determined cut-off time are truncated;
determine pre-determined fields in a block as essential data;
verifying a validity of a transaction; and
any combination of the above.

* * * * *